US009999215B2

(12) United States Patent
Beauchamp

(10) Patent No.: US 9,999,215 B2
(45) Date of Patent: Jun. 19, 2018

(54) WATERFOWL DECOY DEPLOYMENT SYSTEMS

(71) Applicant: Keith Beauchamp, Macon, MO (US)

(72) Inventor: Keith Beauchamp, Macon, MO (US)

(73) Assignee: Quickcoys Outdoor Products LLC, Macon, MO (US)

( * ) Notice: Subject to any disclaimer, the term of this patent is extended or adjusted under 35 U.S.C. 154(b) by 381 days.

(21) Appl. No.: 14/626,258

(22) Filed: Feb. 19, 2015

(65) Prior Publication Data

US 2016/0242409 A1    Aug. 25, 2016

(51) Int. Cl.
*A01M 31/06* (2006.01)
*F16M 13/02* (2006.01)
*F16M 11/04* (2006.01)

(52) U.S. Cl.
CPC ........... *A01M 31/06* (2013.01); *F16M 11/04* (2013.01); *F16M 13/02* (2013.01)

(58) Field of Classification Search
CPC .................................................. A01M 31/06
USPC ......................................................... 43/3, 2
See application file for complete search history.

(56) References Cited

U.S. PATENT DOCUMENTS

| 694,732 | A | 3/1902 | Coudon |
| 970,003 | A | 9/1910 | Wethall |
| 1,746,640 | A | 2/1930 | Emoff |
| 2,547,286 | A | 4/1951 | Sabin |
| 2,624,144 | A | 1/1953 | Beverman |
| 3,950,883 | A | 4/1976 | Shepherd |
| 4,141,167 | A | 2/1979 | Muehl |
| 4,660,313 | A | 4/1987 | Bauernfeind et al. |
| 6,574,902 | B1 | 6/2003 | Conger |
| 6,655,071 | B2 | 12/2003 | Barnes et al. |
| 6,698,132 | B1 * | 3/2004 | Brint ..................... A01M 31/06 43/2 |
| 6,957,509 | B2 | 10/2005 | Wright |
| 7,347,024 | B1 | 3/2008 | Vest |
| 8,256,155 | B1 | 9/2012 | Goodwill et al. |
| 8,887,433 | B2 | 11/2014 | Luttrull |
| 2002/0100206 | A1 * | 8/2002 | Brint ..................... A01M 31/06 43/2 |
| 2008/0295381 | A1 * | 12/2008 | Barr ..................... A01M 31/06 43/2 |
| 2012/0240447 | A1 | 9/2012 | Gurner, III |
| 2013/0014422 | A1 | 1/2013 | Bullerdick et al. |
| 2013/0212924 | A1 | 8/2013 | Shisko |
| 2016/0242409 | A1 | 8/2016 | Beauchamp |

* cited by examiner

*Primary Examiner* — Jessica B Wong
(74) *Attorney, Agent, or Firm* — Armstrong Teasdale LLP

(57) ABSTRACT

A waterfowl decoy deployment system includes a hub subsystem including a casing defining a casing height and a plurality of biasing devices extending though the casing. The plurality of biasing devices is height indexed with respect to the casing height. The waterfowl decoy deployment system also includes a plurality of arms extending radially outward from the hub subsystem. Each arm of the plurality of arms is coupled to a biasing device and a plurality of waterfowl decoys are coupled to each arm of the plurality of arms.

20 Claims, 10 Drawing Sheets

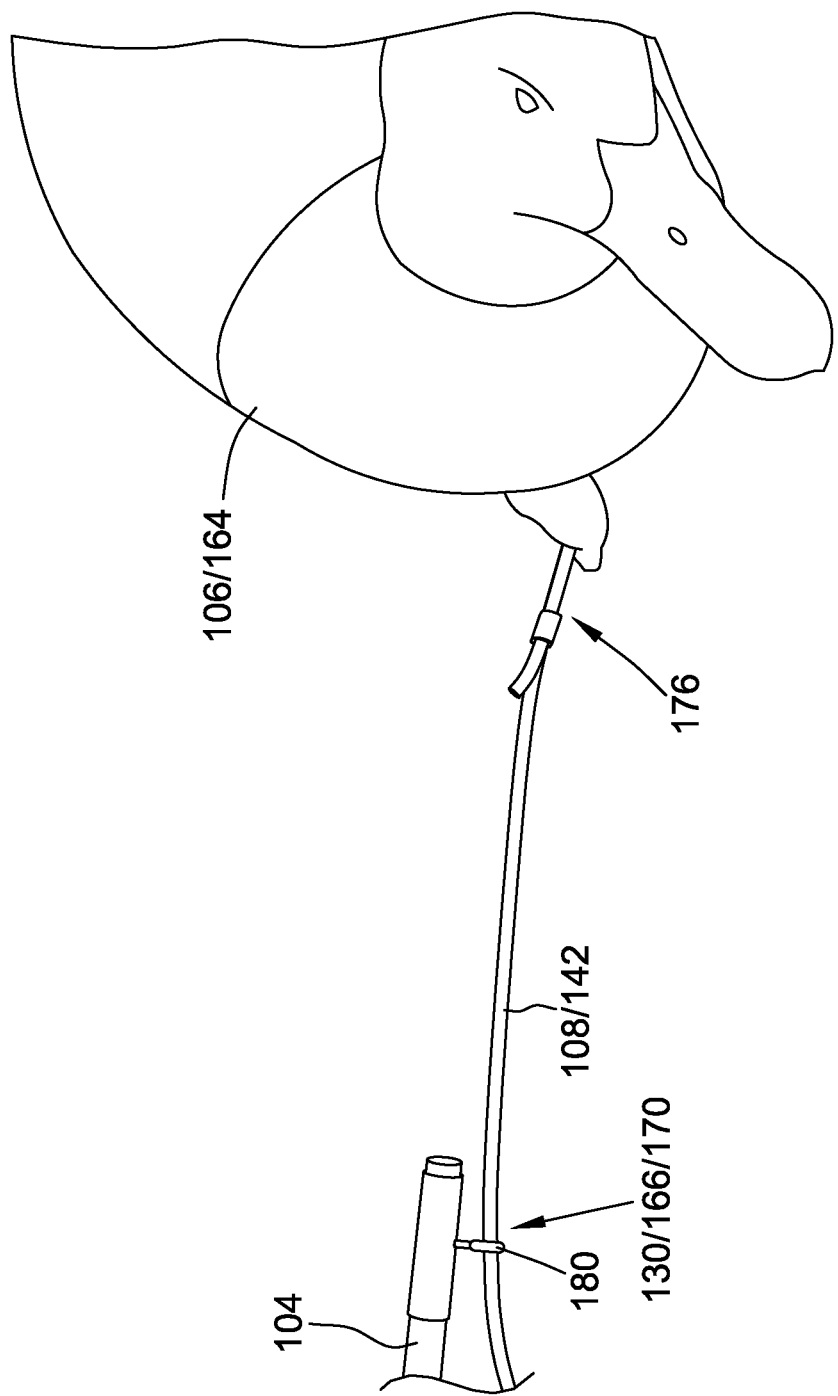

WATERFOWL DECOY DEPLOYMENT SYSTEMS

BACKGROUND

The present disclosure relates generally to hunting decoys, and more particularly to waterfowl, e.g., duck decoy deployment systems.

Most known waterfowl decoy deployment systems are used by hunters to attract waterfowl, such as ducks, so that wild waterfowl are attracted to the decoys and will be brought into shooting range. Many of these known waterfowl decoy deployment systems use submerged components that are spreadable when deploying and collapsible when retrieving. Such known deployment systems typically include a plurality of decoys tethered in some manner to one or more extendable and retractable arms. Many of these known deployment systems experience similar problems. One such problem is that the systems are difficult to deploy and retract since they require some sort of mechanical operation by the hunter. Use of a large numbers of decoys is desirable in order to better attract waterfowl. However, the time and effort needed to deploy and retract decoys becomes more difficult as the number of decoys increases. In addition, storing, deploying, and recovering a large number of decoys on a single system further increase in difficulty because of the tendency of the tethering lines and the decoys to become entangled with each other. Moreover, since most waterfowl hunting seasons are in autumn and winter, increasing the amount of time spending deploying and retracting decoys adds another layer of difficulty to a recreational venture.

BRIEF DESCRIPTION

In one aspect, a waterfowl decoy deployment system is provided. The system includes a hub subsystem including a casing defining a casing height and a plurality of biasing devices extending though the casing. The plurality of biasing devices is height indexed with respect to the casing height. The waterfowl decoy deployment system also includes a plurality of arms extending radially outward from the hub subsystem. Each arm of the plurality of arms is coupled to a biasing device and a plurality of waterfowl decoys are coupled to each arm of the plurality of arms.

In another aspect, a waterfowl decoy deployment system is provided. The system includes a hub and a plurality of arms extending radially outward from the hub. Each arm of the plurality of arms defines a perimeter. The system also includes a plurality of waterfowl decoys coupled to each arm of the plurality of arms through a plurality of decoy tethers. Each waterfowl decoy of the plurality of waterfowl decoys is coupled to a respective decoy tether of the plurality of decoy tethers. The system further includes a decoy tether guide subsystem including a first plurality of guide devices coupled to each arm of the plurality of arms. Each respective guide device of the first plurality of guide devices is configured to receive only one of the plurality of decoy tethers. At least a portion of the first plurality of guide devices is positioned such that they are indexed with respect to the perimeter of each arm of the plurality of arms.

DRAWINGS

FIGS. 1-10 show exemplary embodiments of the apparatus described herein.

FIG. 1 is a schematic perspective view of an exemplary waterfowl decoy deployment system;

FIG. 2 is a schematic side view of an exemplary hub subsystem that may be used with the waterfowl decoy deployment system shown in FIG. 1;

FIG. 3 is a schematic perspective view of the hub subsystem shown in FIG. 2 and a first portion of an exemplary decoy tether guide subsystem that may be used with the waterfowl decoy deployment system shown in FIG. 1;

FIG. 4 is a schematic overhead view of exemplary internal components of the hub subsystem shown in FIGS. 2 and 3;

FIG. 5 is a schematic overhead view of a deployably extendable and flexibly collapsible arm that may be used with the waterfowl decoy deployment system shown in FIG. 1;

FIG. 6 is a schematic perspective view of a portion of the deployably extendable and flexibly collapsible arm shown in FIG. 5 with an exemplary second portion of the decoy tether guide subsystem;

FIG. 7 is a schematic longitudinal view of the portion of the deployably extendable and flexibly collapsible arm shown in FIG. 5 with the second portion of the decoy tether guide subsystem shown in FIG. 5;

FIG. 8 is a schematic overhead view of the portion of the deployably extendable and flexibly collapsible arm shown in FIG. 5 with the second portion of the tether guide subsystem shown in FIG. 5;

Figure 5:
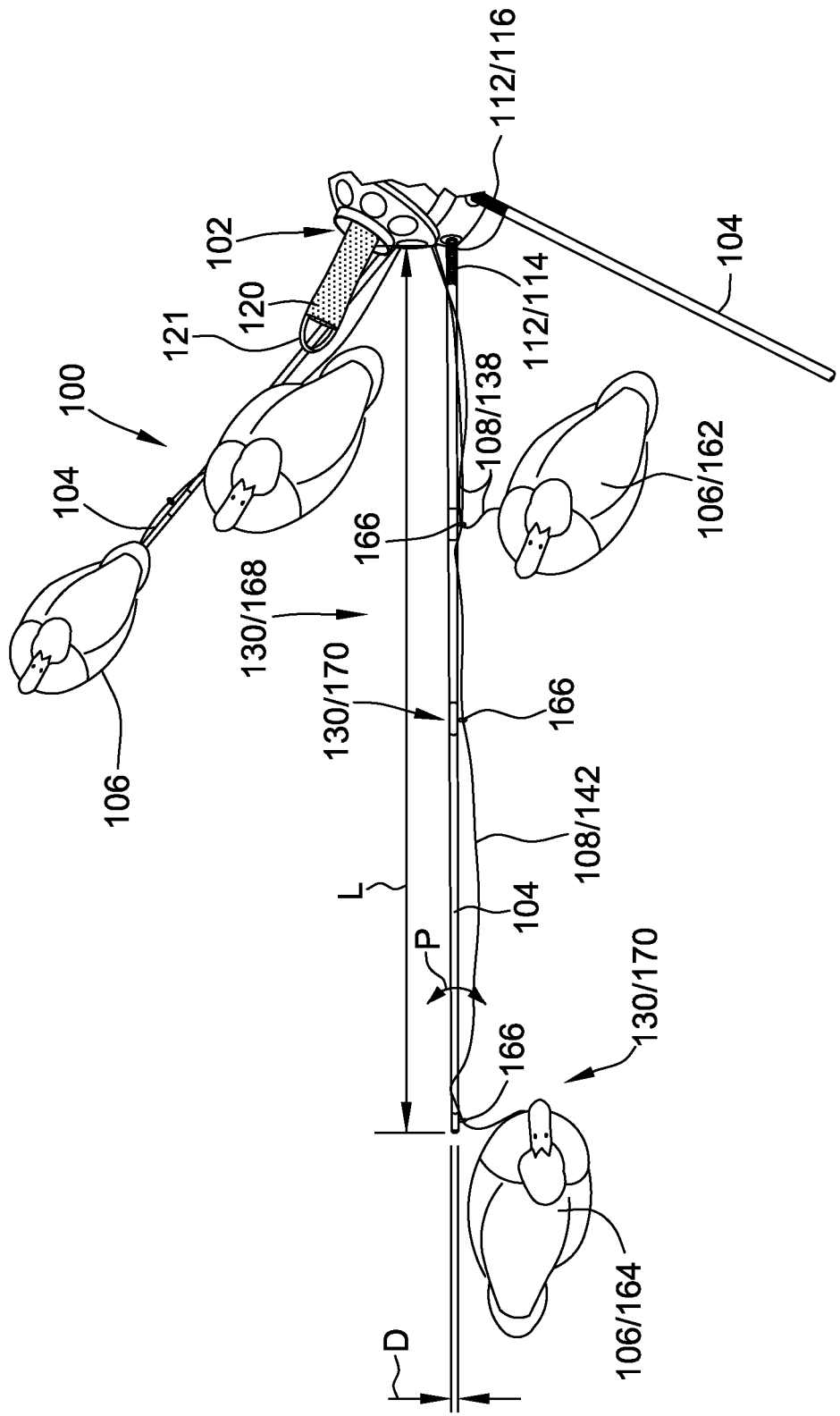
Figure 9:
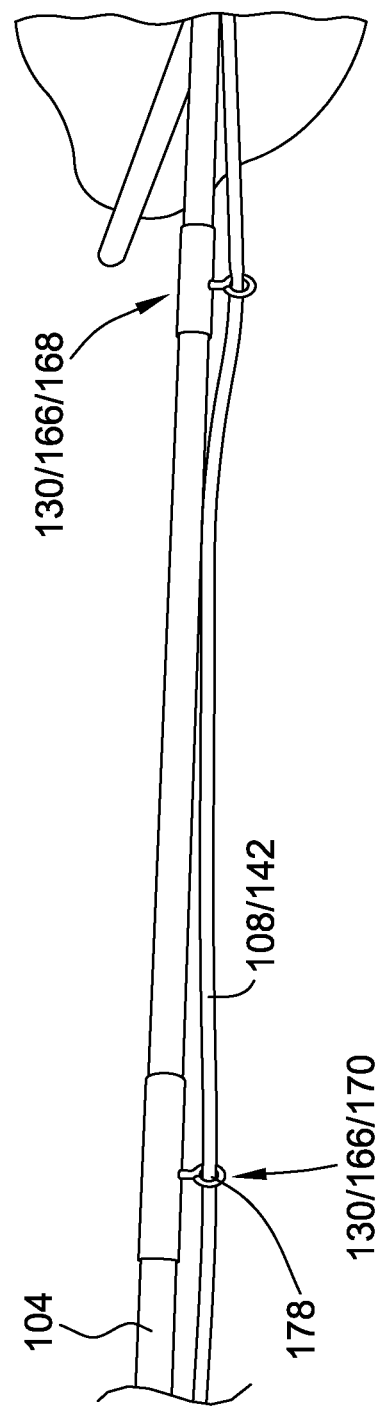

FIG. 9 is a schematic perspective view of another portion of the deployably extendable and flexibly collapsible arm with an exemplary third portion of the decoy tether guide subsystem shown in FIG. 5; and FIG. 10 is another schematic perspective view of the portion of the deployably extendable and flexibly collapsible arm shown in FIG. 9 with the third portion of the decoy tether guide subsystem shown in FIG. 5.

DETAILED DESCRIPTION

The exemplary methods and apparatus described herein overcome at least some disadvantages of known waterfowl decoy deployment systems by providing a hub subsystem and a decoy tether guide subsystem to simplify deployment and retrieval of a large number of duck decoys while mitigating entanglement of the decoys and their tethers. Specifically, the hub subsystem uses an incremental height indexing to facilitate independent and automatic operation of a plurality of deployably extendable and flexibly collapsible arms extending therefrom. Additionally, the decoy tether guide subsystem facilitates mitigating a potential for entanglement of the decoys and their respective tethers.

Figure 1:
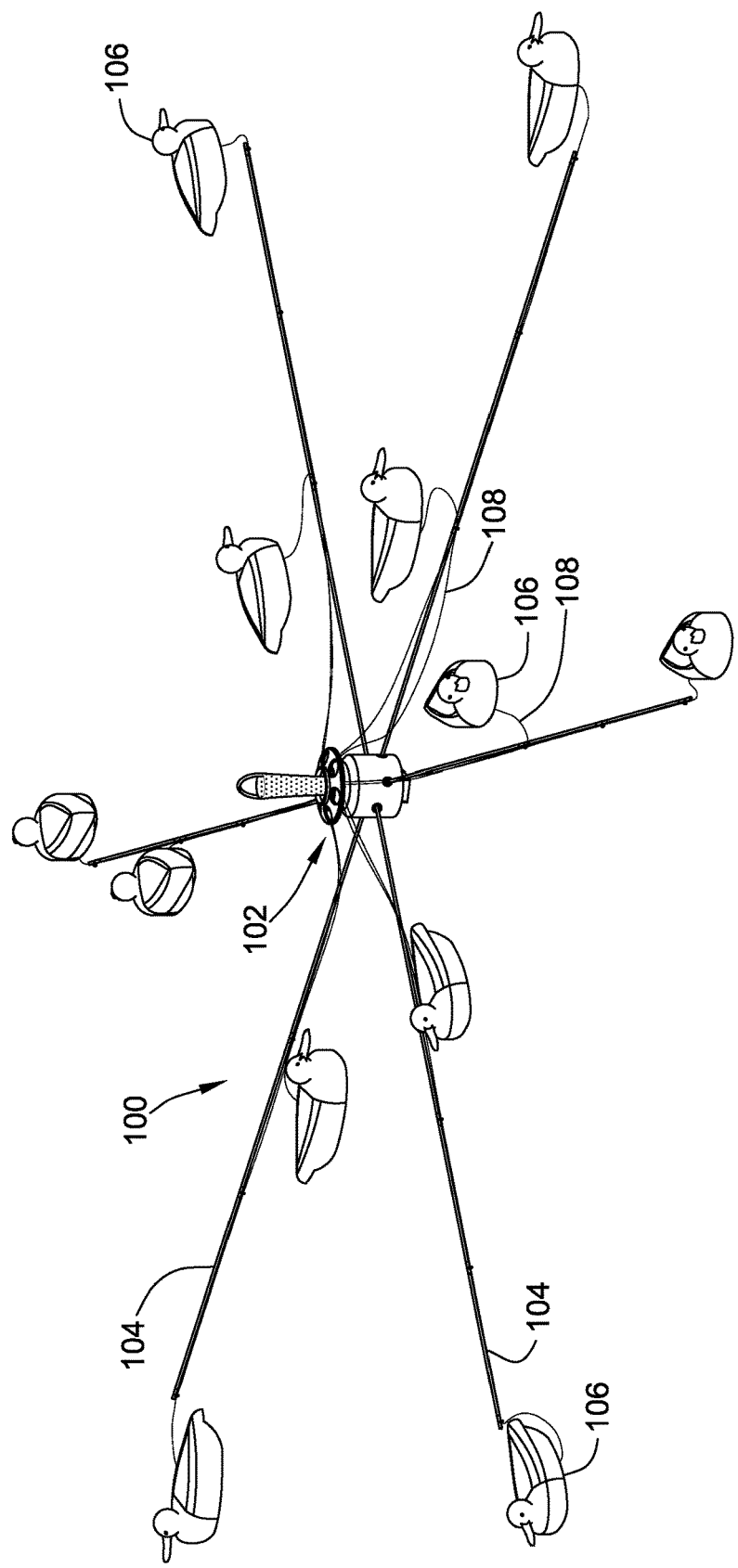

FIG. 1 is a schematic perspective view of an exemplary waterfowl, i.e., duck decoy deployment system 100. Alternatively, decoy deployment system 100 is adaptable for any other waterfowl including, without limitation, geese and swan. Duck decoy deployment system 100 includes a hub subsystem 102 located substantially at a center portion of system 100. Duck decoy deployment system 100 also includes a plurality of arms 104 coupled to, and extending radially outward from, hub subsystem 102. In the exemplary embodiment, system 100 includes six substantially identical, fixed length arms 104. Alternatively, system 100 includes any number of arms 104 having any configuration including, without limitation, varying lengths and materials. Duck decoy deployment system 100 further includes a plurality of waterfowl, i.e., duck decoys 106 coupled to each arm 104 through a respective decoy tether 108, where some of tethers 108 have varying lengths (discussed further below). In the exemplary embodiment, system 100 includes two duck decoys 106 coupled to each arm 104 for a total of twelve decoys 106. Alternatively, system 100 includes any number of duck decoys 106 having any configuration including, without limitation, varying lengths and materials.

Figure 2:
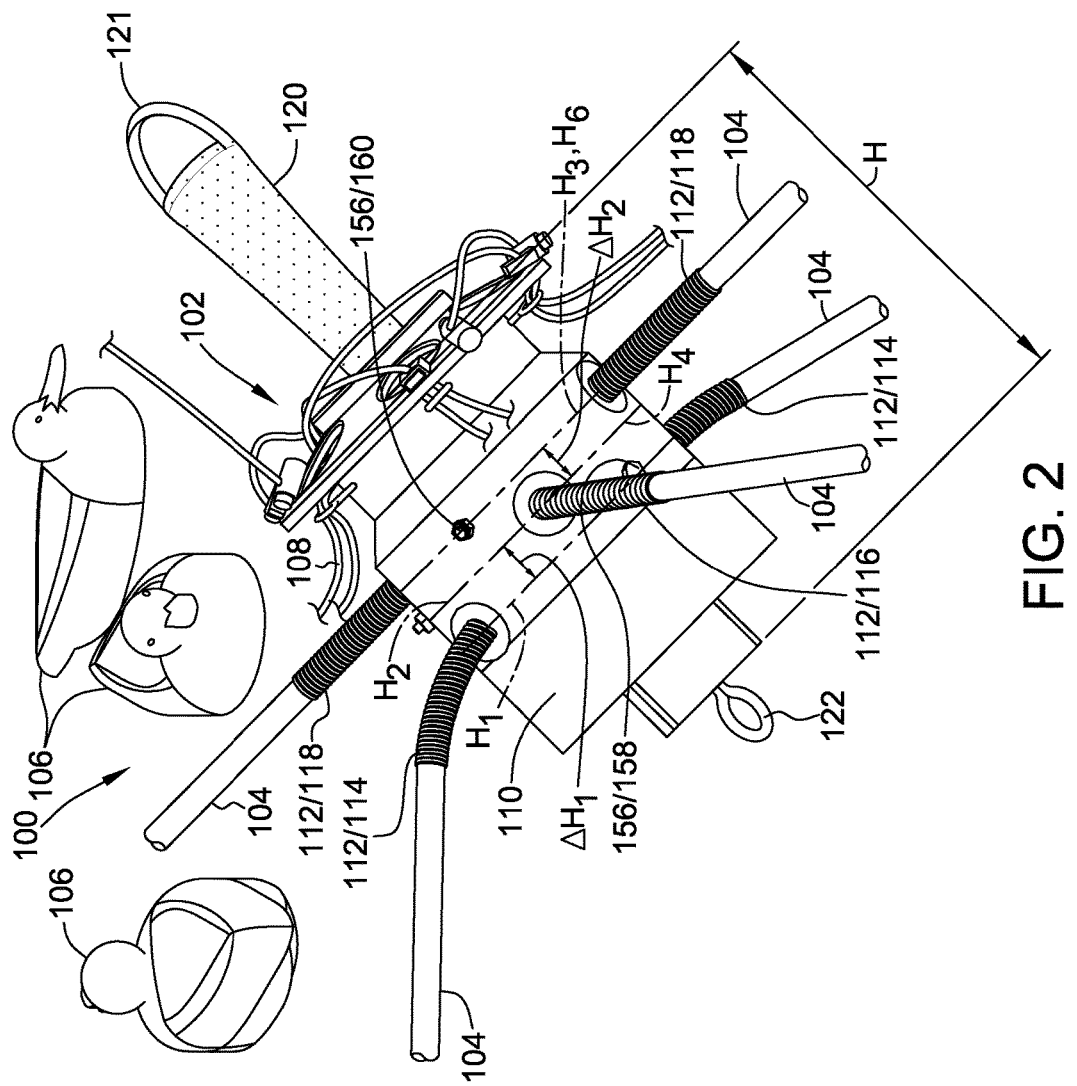

FIG. 2 is a schematic side view of hub subsystem 102 that is used with duck decoy deployment system 100. Hub subsystem 102 includes a casing 110 that defines a casing height H and an external circumferential perimeter (not shown). While casing 110 is substantially cylindrical in shape, any shape that enables operation of system 100 as described herein is used, including, without limitation, rectangular.

Hub subsystem 102 includes a plurality of biasing devices 112 extending though casing 110. In the exemplary embodiment, biasing devices 112 are constant-pitch, constant-diameter, constant-rate (i.e., a substantially non-varying spring constant with a predefined linearity) helical compression springs. Alternatively, biasing devices 112 are any devices that enable operation of duck decoy deployment system 100 as described herein, including, without limitation, biased hinge devices, variable- and multiple-pitch springs, varying diameter springs (i.e., conical springs), and multiple rate springs. Each of biasing devices 112 is coupled to an arm 104 through a friction, or interference fit. Alternatively, biasing devices 112 are coupled to arms 104 through a fastening device.

In the exemplary embodiment, each biasing device 112 is indexed to a height with respect to casing height H defined in the longitudinal direction. Specifically, a first biasing device 114 is positioned at a first circumferential height line $H_1$ that is referenced a center of a biasing device aperture (not shown) defined by casing 110 through which first biasing device 114 extends. Similarly, a second biasing device 116 is positioned at a second circumferential height line $H_2$ that is referenced a center of a biasing device aperture (not shown) defined by casing 110 through which second biasing device 116 extends. Also, similarly, a third biasing device 118 is positioned at a third circumferential height line $H_3$ that is referenced a center of a biasing device aperture (not shown) defined by casing 110 through which third biasing device 118 extends. First circumferential height line $H_1$ and second circumferential height line $H_2$ define a first differential height $\Delta H_1$. Similarly, second circumferential height line $H_2$ and third circumferential height line $H_3$ define a second differential height $\Delta H_2$. First differential height and second differential height $\Delta H_2$ have values in a range between approximately ⅜ of an inch (9.53 millimeters (mm)) and approximately ½ an inch (12.7 mm). Circumferential height lines $H_1$, $H_2$, and $H_3$ in cooperation with differential heights $\Delta H_1$ and $\Delta H_2$ at least partially define the height indexing of biasing devices 112 and arms 104.

Arms 104 are coupled to biasing devices 112 such that no portion of arms 104 extend through the biasing device apertures defined in casing 110, thereby facilitating substantially unencumbered motion of biasing devices 112 in three dimensions.

Also, in the exemplary embodiment, there are six biasing devices 112 positioned approximately 60° apart from each other along the circumferential perimeter of casing 110. Specifically, there are first, second, and third biasing devices 114, 116, and 118, respectively, as shown. Each of these three biasing devices 112 has a substantially similar device 112 180° opposite extending through casing 110 at substantially the same circumferential height line $H_1$, $H_2$, and $H_3$, respectively. In general, biasing devices 112 are positioned about the circumferential perimeter of casing 110 at circumferential positions of approximately 360 degrees divided by the number of arms 104. As such, hub subsystem 102 is substantially symmetrical. Alternatively, hub subsystem 102 has any configuration with any number of biasing devices 112 and number of arms 104 that enable operation of system 100 as described herein.

Further, in the exemplary embodiment, duck decoy deployment system 100 includes a handle 120 coupled to an upper portion of hub subsystem 102, where handle 120 extends longitudinally outward from hub subsystem 102. A hook eye 121 is coupled to, and extends from, handle 120. Handle 120 and hook eye 121 facilitate placement and recovery of system 100 in aqueous environments through either hand placement or a hooked rod. Alternatively, any handling device that enables operation of system 100 as described herein is used, including, without limitation, an eye device that facilitates placement with a hook device.

Moreover, duck decoy deployment system 100 includes a weight coupling device 122 coupled to a bottom portion of hub subsystem 102, wherein weight coupling device 122 extends longitudinally outward from hub subsystem 102. Weight coupling device 122 is an eyebolt. Alternatively, weight coupling device 122 is any device that enables operation of system 100 as described herein, including, without limitation, a weight device that couples directly to the bottom of casing 110.

Figure 3:
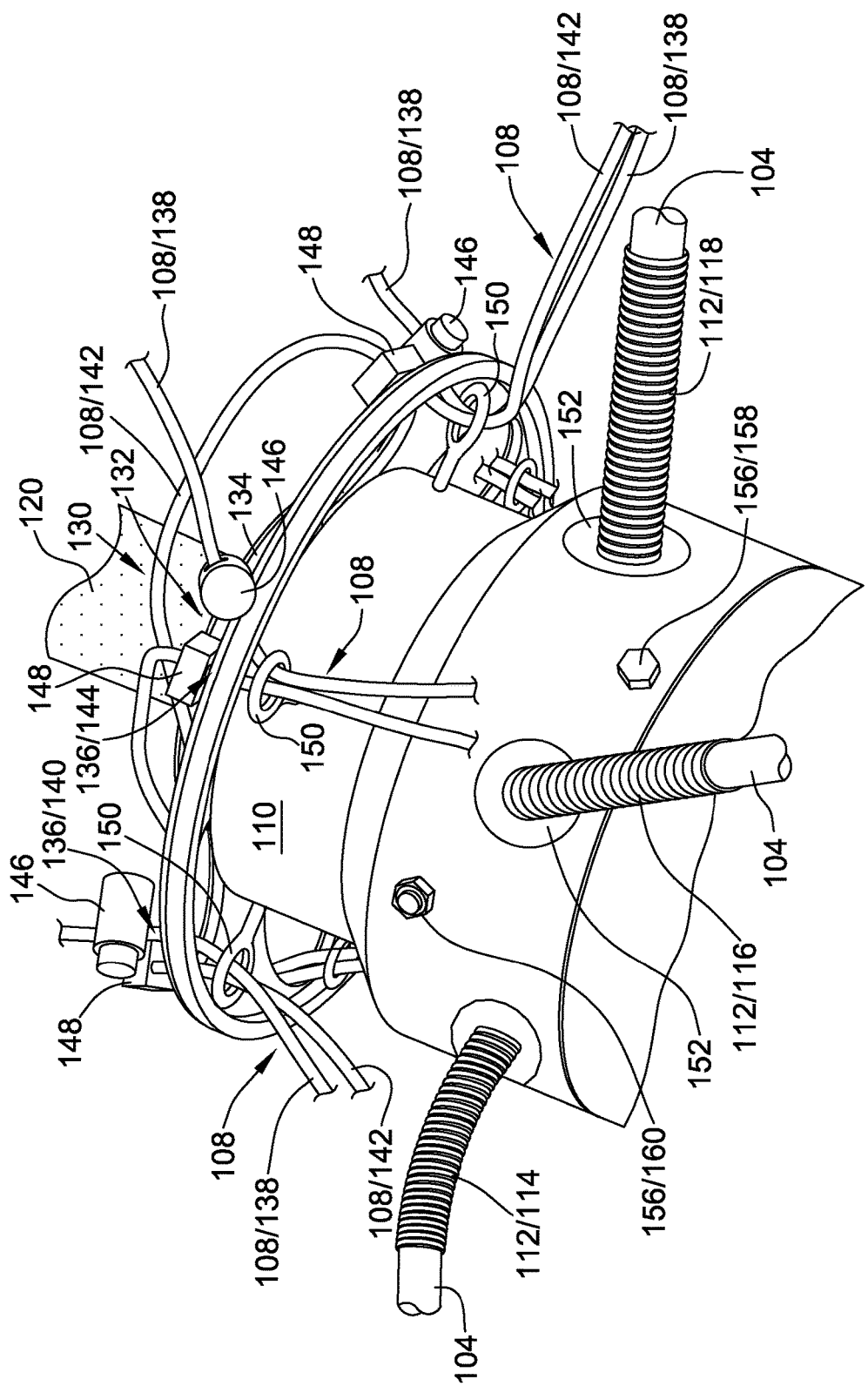

FIG. 3 is a schematic perspective view of hub subsystem 102 including an exemplary decoy tether guide subsystem 130 that may be used with duck decoy deployment system 100 (shown in FIG. 1). A first portion 132 of subsystem 130 is shown in FIG. 3. Hub subsystem 102 includes a cap device 134 that is also associated with first portion 132. Cap device 134 defines a plurality of tether apertures 136 that receive tethers 108. Also, cap device 134 is coupled to casing 110 through a friction, or interference fit. Alternatively, cap device 134 is coupled to casing 110 through any means that enables operation of system 100 as described herein, including, without limitation, fastening devices and adhesives.

In the exemplary embodiment, a first decoy tether 138 of decoy tethers 108 extends through a first tether aperture 140 of plurality of apertures 136. Also, a second decoy tether 142 of decoy tethers 108 extends through a second tether aperture 144 of plurality of apertures 136. First decoy tether 138 extends through first tether aperture 140 and is coupled to cap device 134 through a first tether securing device 146 proximate first tether aperture 140. First tether securing device 146 is a cylindrically shaped clamping device. Alternatively, first tether securing device 146 is any device that enables operation of system 100 as described herein, including, without limitation, fastening devices and adhesives. Second decoy tether 142 extends through second tether aperture 144 and is coupled to cap device 134 through a second tether securing device 148 proximate second tether aperture 140. Second tether securing device 148 is a square-shaped guide device. Alternatively, second tether securing device 148 is any device that enables operation of system 100 as described herein, including, without limitation, first tether securing device 146.

Further, in the exemplary embodiment, in addition to tether apertures 140 and 144 and securing devices 146 and 148, first portion 132 of decoy tether guide subsystem 130 a plurality of guide devices 150 coupled to casing 110. Guide devices 150 are eye bolts. Alternatively, guide devices 150 are any devices that enable operation of system 100 as described herein, including, without limitation, tubular conduits. Each guide device 150 receives a portion of decoy tethers 108 therethrough, i.e., one first decoy tether 138 and one second decoy tether 142. Each guide device 150 is separated from each adjacent guide device 150 by approximately 60°. Also, each guide device 150 is positioned proximate a respective pair of tether apertures 140 and 144 and a respective arm 104.

Moreover, in the exemplary embodiment, first decoy tether 138 is terminated proximate first securing devices 146. Second decoy tether 142 extends across the top of cap device 134 from securing device 148 to the other symmetrical and respective securing device 148. Therefore, the portion of second decoy tether 142 that extends across the top of cap device 134 is a single continuous string. Alternatively, any configuration of second decoy tethers 142 is used that enables operation of system 100 as described herein, including, without limitation, a configuration similar to that for first decoy tether 138.

In addition, in the exemplary embodiment, duck decoy deployment system 100 includes a plurality of dampening devices 152 inserted into the biasing device apertures to secure biasing devices 112 through the friction fit, facilitate three-dimensional movement of biasing devices 112, and to dampen stresses induced in casing 110 where biasing devices extend through the respective apertures. Dampening devices 152 are grommets. Alternatively, any device for dampening devices 152 are used that that enable operation of system 100 as described herein, including, without limitation, washers.

Figure 4:
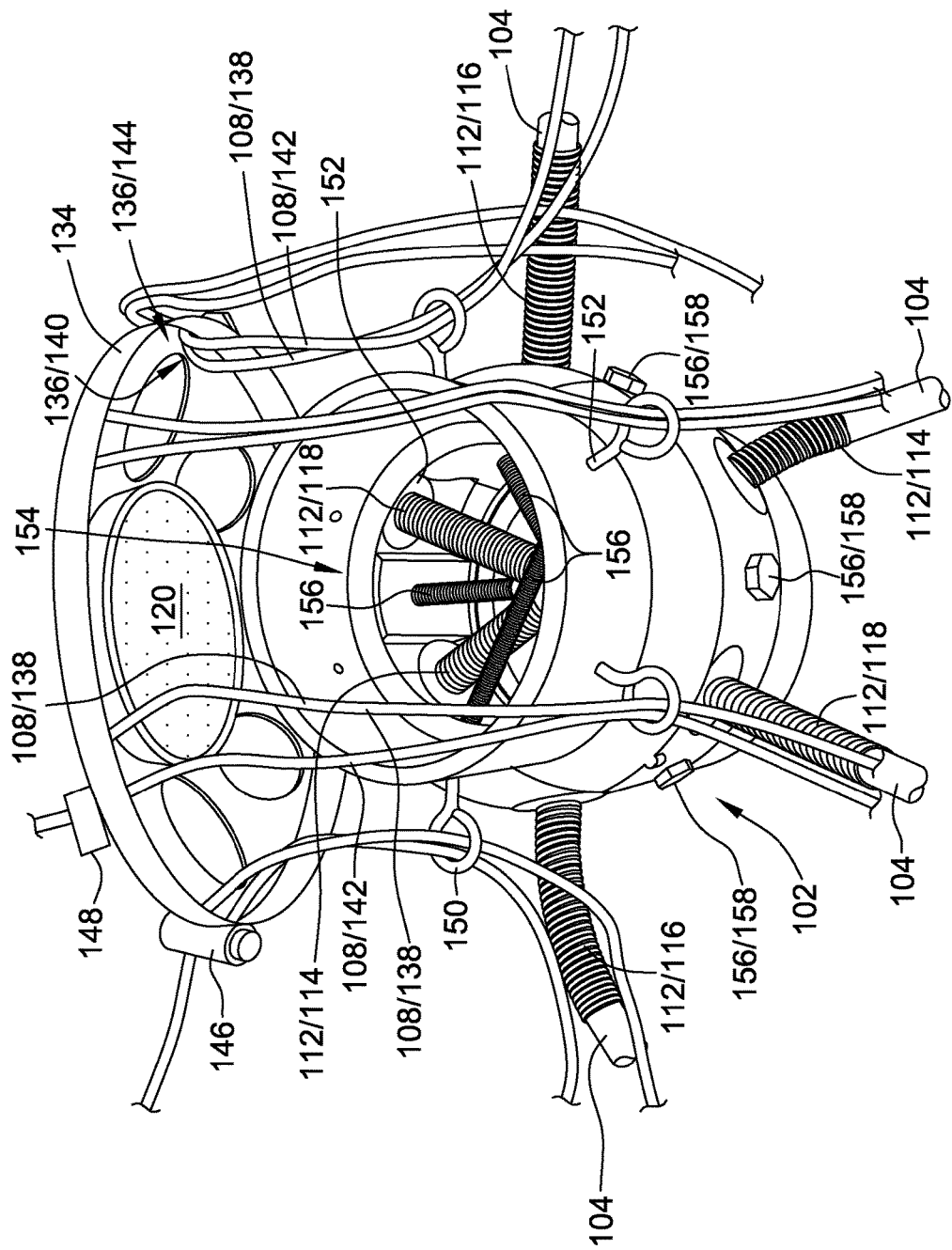

FIG. 4 is a schematic overhead view of exemplary internal components of hub subsystem 102. Cap device 134 is shown removed from casing 110 that defines a cavity 154 therein. Dampening devices 152 extend through the apertures for biasing devices 112. Biasing devices 112 are shown height indexed in cavity 154 as described above.

Referring to FIG. 2 with FIG. 4, a plurality of fasteners 156 are extended through casing 110. Each fastener 156 includes a hexagonal head 158 and a nut 160 (only one shown in FIG. 2) on opposing sides of casing 110 with approximately 180° between hexagonal head 158 and nut 160. There are three fasteners 156. Alternatively, there are any number of fasteners 156 that enable operation of system 100 as described herein.

Referring to FIG. 2, in the exemplary embodiment, each fastener 156 is indexed to a height with respect to casing height H defined in the longitudinal direction in a manner similar to that used for biasing devices 112. Specifically, a first circumferential height line $H_4$ is referenced a center of head 158 of fastener 156. Similarly, a second circumferential height line $H_5$ (not shown) is similarly referenced. Also, similarly, a third circumferential height line $H_6$ is referenced to a center of nut 160 of fastener 156. Circumferential height lines $H_4$, $H_5$, and $H_6$ differential heights therebetween that have values in a range between approximately 3/8 of an inch (9.53 mm) and approximately 1/2 an inch (12.7 mm). Circumferential height lines $H_4$, $H_5$, and $H_6$ in cooperation with the differential heights therebetween at least partially define the height indexing of fasteners 156. Such height indexing of fasteners 156 is also determined in conjunction with the height indexing of biasing devices 112. Specifically, a first fastener, i.e., a lowermost fastener 156 is coupled to a pair of first biasing devices 114, a second fastener, i.e., a middle fastener 156 is coupled to a pair of second biasing devices 116, and a third fastener, i.e., an uppermost fastener 156 is coupled to a pair of third biasing devices 118. Therefore, biasing devices 112 are secured within cavity 154. In general, nuts 160 and heads 158 of fasteners 156 are positioned about the circumferential perimeter of casing 110 at circumferential positions of approximately 360 degrees divided by the number of arms 104.

FIG. 5 is a schematic overhead view of deployably extendable and flexibly collapsible arm 104 that may be used with duck decoy deployment system 100. In the exemplary embodiment, arm 104 has a fixed length L that is approximately 4 feet (1.22 meters). Alternatively, arm 104 is any length that enables operation of system 100 as described herein. First decoy tether 138 is coupled to arm 104 and a first duck decoy 162. Second decoy tether 142 is coupled to arm 104 and a second duck decoy 164. Arm 104 is substantially cylindrical in shape and defines a substantially constant diameter D and a circumferential perimeter P. Alternatively, arm 104 has any shape that enables operation of system 100 as described herein, including, without limitation, oval, rectangular, and varying diameters, thicknesses, and perimeters. In the exemplary embodiment, diameter D is approximately 3/8 of an inch (9.53 mm) and perimeter P is approximately 1.2 inches (30.5 mm). Alternatively, arm 104 has any dimensions that enable operation of system 100 as described herein.

Also, in the exemplary embodiment, duck decoys 106 and tethers 108 are coupled to arm 104 through a plurality of guide devices 166 that define a second portion 168 of decoy tether guide subsystem 130 discussed further below. The radially outermost guide device 166 is positioned proximate the outermost end of arm 104 and the radially inner guide device is positioned approximately 33% of arm length L from hub subsystem 102.

Figure 6:
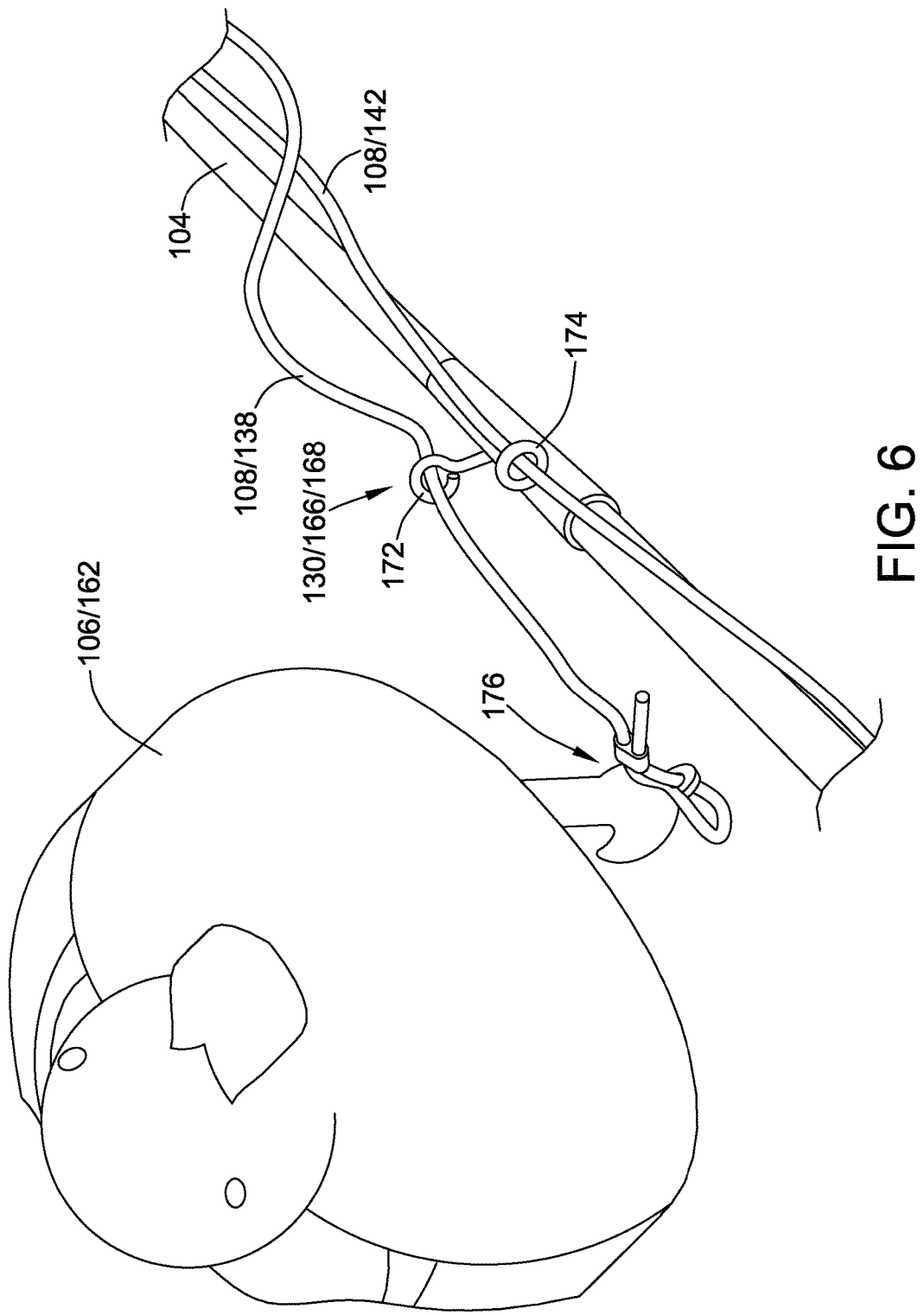
Figure 7:
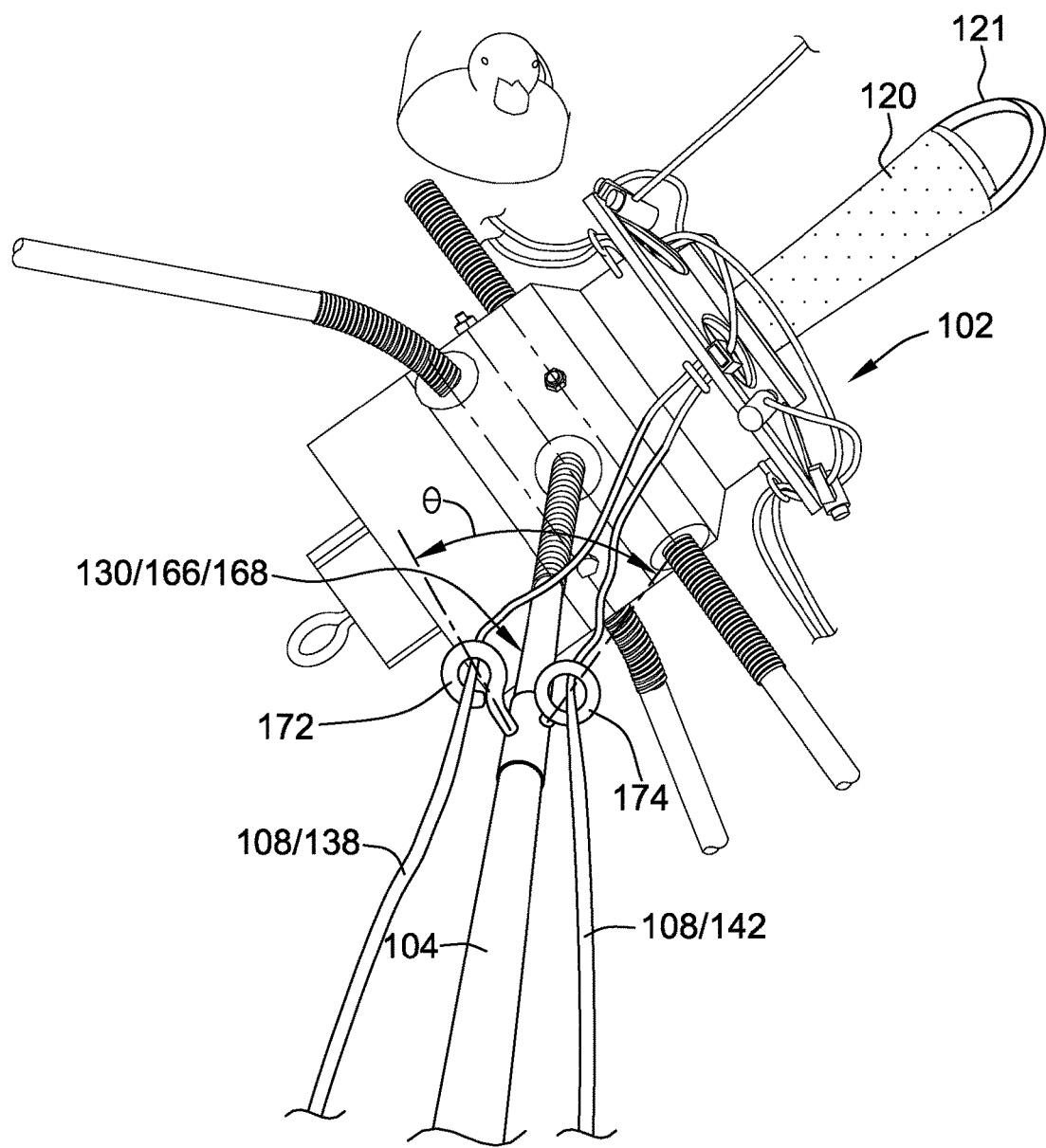
Figure 8:
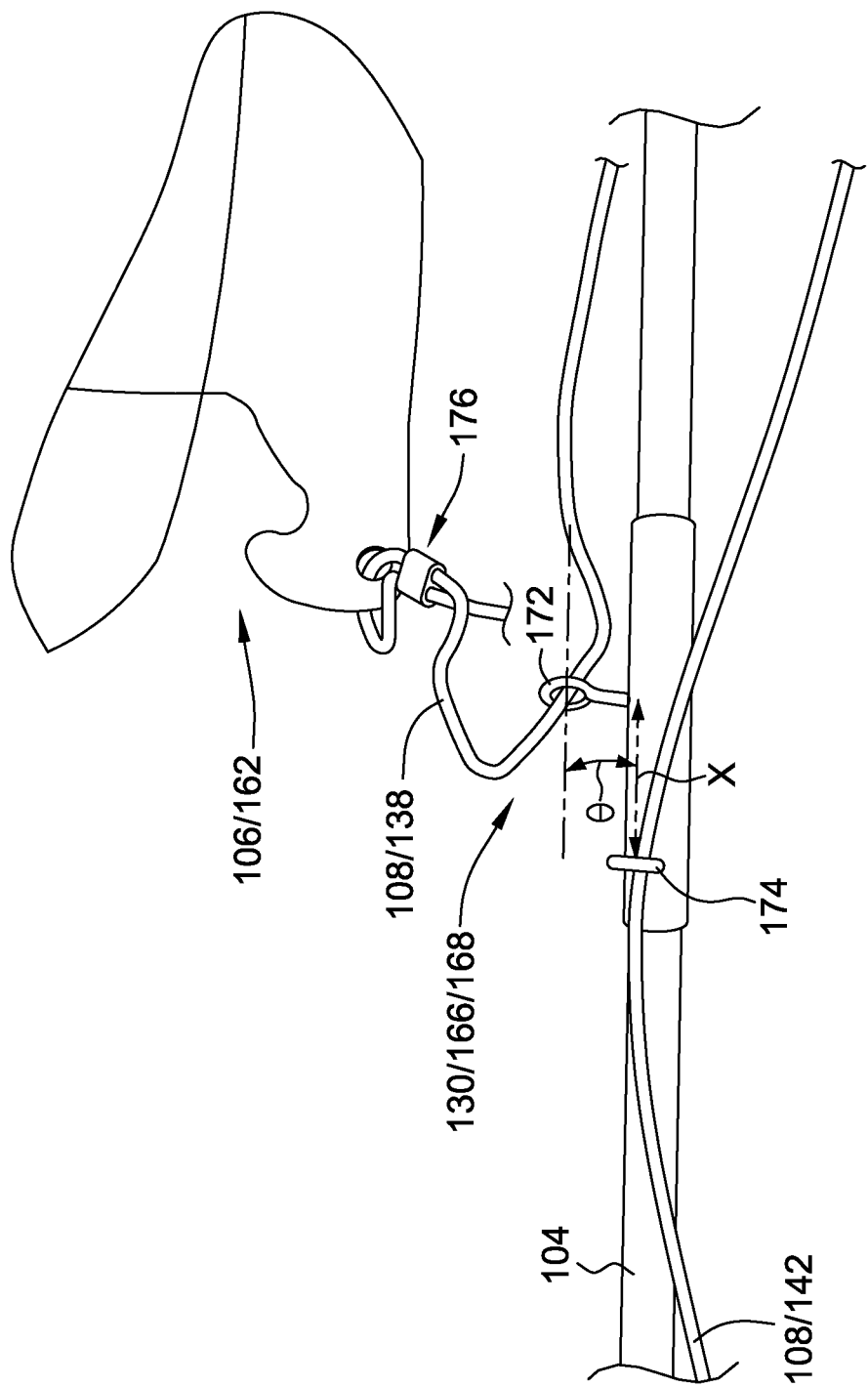

FIG. 6 is a schematic perspective view of a portion of deployably extendable and flexibly collapsible arm 104 with second portion 168 of decoy tether guide subsystem 130. FIG. 7 is a schematic longitudinal view of deployably extendable and flexibly collapsible arm 104 with second portion 168 of decoy tether guide subsystem 130. FIG. 8 is a schematic overhead view of deployably extendable and flexibly collapsible arm 104 with second portion 168 of the tether guide subsystem 130. Second portion 168 includes a first guide device 172 and a second guide device 174 coupled to arm 104 and positioned proximate each other. Guide devices 172 and 174 are eye bolts. Alternatively, guide devices 172 and 174 are any devices that enable operation of system 100 as described herein, including, without limitation, tubular conduits.

First guide device 172 and a second guide device 174 are indexed. i.e., they are separated with an angle θ and a distance X. Angle θ includes values within a range between approximately 30° and 45°, where in the exemplary embodiment angle θ is approximately a 45° angle. Distance X has a value of approximately 1.5 inches (38.1 mm). Alternatively, angle θ and distance X have any values that enable operation of system 100 as described herein. First guide device 172 and a second guide device 174 are indexed to facilitate significantly reducing a potential for first decoy tether 138 and second decoy tether 142 to become entangled with each other. First decoy tether 138 is threaded through first guide device 172 and second decoy tether 142 is threaded through second guide device 174. First decoy tether 138 is coupled to first duck decoy 162 through a coupling device 176. In the exemplary embodiment, coupling device 176 is a crimped fastener. Alternatively, any coupling device that enables operation of system 100 as described herein is used, including, and without limitation, waterproof tape.

FIG. 9 is a schematic perspective view of a portion of deployably extendable and flexibly collapsible arm 104 with third portion 170 of decoy tether guide subsystem 130. FIG. 10 is another schematic perspective view of deployably extendable and flexibly collapsible arm 104 with third portion 170 of decoy tether guide subsystem 130. Third portion 170 includes a third guide device 178 (only shown in FIG. 9) and a fourth guide device 180. Guide devices 178 and 180 are eye bolts. Alternatively, guide devices 178 and 180 are any devices that enable operation of system 100 as described herein, including, without limitation, tubular conduits.

Second decoy tether 142 is threaded through third guide device 178 and fourth guide device 180. Second decoy tether 142 is coupled to second duck decoy 164 through coupling device 176. In the exemplary embodiment, coupling device 176 is a crimped fastener. Alternatively, any coupling device that enables operation of system 100 as described herein is used, including, and without limitation, waterproof tape.

Referring to FIGS. 1 through 10, in operation, duck decoy deployment system 100 is initially in a folded or collapsed condition, where arms 104 are substantially parallel to the longitudinal direction and handle 120. As such, biasing devices 112 have approximately a 90° bend upward. System 100 is lifted by handle 120, a weight is coupled to weight coupling device 122, and system 100 is dropped into water of a predetermined depth, e.g., and without limitation, within a range between approximately 20 feet (6.1 meters) and 25 feet (7.6 meters).

While in the collapsed position, arms 104 are restrained with any restraining device that enables operation of system 100 as described herein, including, without limitation, a restraining band and rope. The restraining device is removed and arms 104 drop through gravity into the water into the extended, i.e., deployed condition. Hub subsystem 102 and the weight pull hub subsystem 102 below the surface of the water toward the bottom with a gradual submergence over time in contrast to a rapid sinking. As such, the weight coupled to weight coupling device 122 is selected based on the weight and buoyancy of system 100 as a whole, thereby establishing a relative neutral buoyancy for system 100. Arms 104 drop below the surface of the water and the buoyant duck decoys 106 float on the surface, thereby preventing further sinking of arms 104. Hub subsystem 102 eventually sits within a range between approximately 12 inches (30.5 centimeters (cm)) and 24 inches (61 cm) below the surface of the water, at least partially depending on the length of tethers 108. As such, with the exception of decoys 106, system 100 is substantially submerged and not visible to incoming waterfowl.

As arms 104 drop, each first decoy tether 138 slides through the respective first guide device 172 and is at least partially restrained by the respective guide device 150 and first guide device 172. Similarly, second decoy tether 142 slides through second, third, and fourth guide devices 174, 178, and 180, respectively. Also, similarly, second decoy tether 142 is at least partially restrained by the respective guide device 150 and the respective second, third, and fourth guide devices 174, 178, and 180. Such restraint of tethers 138 and 142 facilitates significantly decreasing entanglement of tethers 138 and 142 during deployment of system 100. Therefore, the indexing of second and third portions of decoy tether guide subsystem 130 as described above facilitates ease of deployment of system 100. In addition, height indexing of first, second, and third biasing devices 114, 116, and 118, respectively, as described herein further facilitates ease of deployment of system 100.

Hub subsystem 102 is free to rotate with the natural currents of the water and the wind. Therefore, arms 104, with duck decoys 106, are free to rotate with hub subsystem 102 with movements that simulate natural duck movements. Also, in operation, system 100 is retrieved through grabbing hub subsystem 102 through handle 120 or hook eye 121, lifting system 100 out of the water, and placed into a bag-like transport device to place arms 104 into the collapsed position. Restraint of tethers 138 and 142 for deployment as describe above also facilitates significantly decreasing entanglement of tethers 138 and 142 during recovery of system 100.

The exemplary methods and apparatus described herein overcome at least some disadvantages of known waterfowl decoy deployment systems by providing a hub subsystem and a decoy tether guide subsystem to simplify deployment and retrieval of a large number of duck decoys while mitigating entanglement of the decoys and their tethers. Specifically, the hub subsystem uses an incremental height indexing to facilitate independent and automatic operation of a plurality of deployably extendable and flexibly collapsible arms extending therefrom. Additionally, the decoy tether guide subsystem facilitates mitigating a potential for entanglement of the decoys and their respective tethers.

Exemplary embodiments of a waterfowl decoy deployment system are described above in detail. The waterfowl decoy deployment system is not limited to the specific embodiments described herein, but rather, components of the apparatus may be utilized independently and separately from other components described herein. For example, the features of the waterfowl decoy deployment system described herein may also be used in combination with other deployment systems that call for rapid and easy deployment and recovery.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A waterfowl decoy deployment system comprising:
   a hub;
   a plurality of arms extending radially outward from said hub, each arm of said plurality of arms defining a perimeter;
   a plurality of biasing devices, wherein each said biasing device couples an arm of said plurality of arms to said hub such that said plurality of biasing devices facilitate motion of said plurality of arms in three dimensions;
   a plurality of waterfowl decoys coupled to said each arm of said plurality of arms through a plurality of decoy tethers, wherein each waterfowl decoy of said plurality of waterfowl decoys is coupled to a respective decoy tether of said plurality of decoy tethers, each decoy tether of said plurality of decoy tethers extending from said hub; and
   a decoy tether guide subsystem comprising a first plurality of guide devices coupled to said each arm of said plurality of arms, each respective guide device of said first plurality of guide devices configured to receive only one decoy tether of said plurality of decoy tethers, wherein at least a portion of said first plurality of guide devices are positioned such that they are indexed with respect to the perimeter of said each arm of said plurality of arms.

2. The waterfowl decoy deployment system in accordance with claim 1, wherein said hub comprises a portion of said decoy tether guide subsystem further comprising a second plurality of guide devices coupled to said hub, wherein each guide device of said second plurality of guide devices defines an opening therethrough such that each guide device of said second plurality of guide devices is configured to receive a pair of said plurality of decoy tethers therethrough.

3. The waterfowl decoy deployment system in accordance with claim 1, wherein said each arm of said plurality of arms is substantially cylindrical, thereby defining a circumference, wherein said at least a portion of said first plurality of guide devices are positioned proximate each other, said at least a portion of said first plurality of guide devices positioned such that they are indexed to define an angle therebetween, the angle being within a range between 30 degrees and 60 degrees.

4. The waterfowl decoy deployment system in accordance with claim 3, wherein said at least a portion of said first plurality of guide devices are positioned such that they are indexed to define a 45 degree angle therebetween.

5. The waterfowl decoy deployment system in accordance with claim 1, wherein said at least a portion of said first plurality of guide devices comprises:
a first guide device of said plurality of first guide devices configured to receive a first decoy tether of said plurality of decoy tethers extending therethrough wherein said first decoy tether is coupled to a first waterfowl decoy of said plurality of waterfowl decoys; and
a second guide device of said plurality of first guide devices configured to receive a second decoy tether of said plurality of decoy tethers extending therethrough wherein said second decoy tether is coupled to a second waterfowl decoy of said plurality of waterfowl decoys.

6. The waterfowl decoy deployment system in accordance with claim 5, wherein said hub further comprises a cap device directly coupled to said hub, said cap device defines a plurality of apertures, wherein:
said first decoy tether of said plurality of decoy tethers extends through a first aperture of said plurality of apertures; and
said second decoy tether of said plurality of decoy tethers extends through a second aperture of said plurality of apertures.

7. The waterfowl decoy deployment system in accordance with claim 6, wherein:
said first decoy tether of said plurality of decoy tethers extending through said first aperture of said plurality of apertures is secured to said cap device through a first securing device proximate said first aperture of said plurality of apertures; and
said second decoy tether of said plurality of decoy tethers extending through said second aperture of said plurality of apertures is secured to said cap device through a second securing device proximate said second aperture of said plurality of apertures.

8. The waterfowl decoy deployment system in accordance with claim 1 further comprising a handle coupled to an upper portion of said hub, said handle extends longitudinally outward from said hub.

9. The waterfowl decoy deployment system in accordance with claim 1 further comprising a weight coupling device coupled to a bottom portion of said hub, said weight coupling device extends longitudinally outward from said hub.

10. The waterfowl decoy deployment system in accordance with claim 2, wherein said each guide device of said second plurality of guide devices is configured to receive two decoy tethers of said plurality of decoy tethers, said each guide device of said second plurality of guide devices further configured to partially restrain said two decoy tethers in cooperation with said at least a portion of said first plurality of guide devices.

11. The waterfowl decoy deployment system in accordance with claim 10, wherein said each guide device of said second plurality of guide devices is positioned with a predetermined radial spacing about said hub at radial positions of approximately 360 degrees divided by a number of said plurality of arms.

12. The waterfowl decoy deployment system in accordance with claim 1, wherein said hub further comprises a casing and a cap device directly coupled to said casing, and wherein said decoy tether guide subsystem further comprises a second plurality of guide devices coupled to said hub such that said second plurality of guide devices are circumferentially spaced about said casing.

13. The waterfowl decoy deployment system in accordance with claim 1, wherein said hub further comprises a casing and a cap device directly coupled to an upper portion of said hub, wherein said cap device is stationary with respect to said hub.

14. The waterfowl decoy deployment system in accordance with claim 1, wherein each arm of said plurality of arms is coupled to said hub at a different longitudinal location along a height of said hub than a circumferentially adjacent arm of said plurality of arms.

15. The waterfowl decoy deployment system in accordance with claim 1, wherein said hub further comprises a casing defining a casing height, and wherein said plurality of biasing devices extend though said casing, wherein each biasing device of said plurality of biasing devicesis coupled to said casing at a different longitudinal location along the height of said casing than a circumferentially adjacent biasing device of said plurality of biasing devices.

16. The waterfowl decoy deployment system in accordance with claim 15, further comprising a plurality of fasteners extending through said casing, said plurality of fasteners height indexed with respect to the casing height.

17. The waterfowl decoy deployment system in accordance with claim 16, wherein said plurality of fasteners are further height indexed with respect to said plurality of biasing devices.

18. The waterfowl decoy deployment system in accordance with claim 17, wherein a first fastener of said plurality of fasteners is coupled to a first biasing device of said plurality of biasing devices, and a second fastener of said plurality of fasteners is coupled to a second biasing device of said plurality of biasing devices.

19. The waterfowl decoy deployment system in accordance with claim 16, wherein said casing defines a circumferential perimeter:
said plurality of fasteners are positioned about the circumferential perimeter of said casing at circumferential positions of approximately 360 degrees divided by a number of said plurality of arms; and
said plurality of biasing devices are positioned about the circumferential perimeter of said casing at circumferential positions of approximately 360 degrees divided by a number of said plurality of arms.

20. The waterfowl decoy deployment system in accordance with claim 1, further comprising a plurality of dampening devices, wherein said plurality of biasing devices extends though said plurality of dampening devices.

* * * * *